United States Patent
Lammon-Hilinski et al.

(10) Patent No.: US 6,239,050 B1
(45) Date of Patent: May 29, 2001

(54) PHOTOCATALYTIC FILTER WITH FIBER GLASS MAT CARRIER

(75) Inventors: Kami Lammon-Hilinski, Aspinwall; Anastasia Morfesis, O'Hara Township; Thomas P. Unites, Library, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/183,570

(22) Filed: Oct. 30, 1998

(51) Int. Cl.$^7$ ....................................... B04D 1/00
(52) U.S. Cl. .................. 442/180; 442/331; 442/59; 442/71; 442/108; 442/111; 442/118; 442/81; 442/99; 442/172; 442/180; 422/186.3
(58) Field of Search ................. 442/59, 71, 108, 442/111, 118, 81, 99, 172, 180, 331

(56) References Cited

U.S. PATENT DOCUMENTS

| | | | |
|---|---|---|---|
| 4,369,264 | 1/1983 | Baumann et al. | 523/209 |
| 4,448,911 | 5/1984 | Haines et al. | 523/411 |
| 4,892,712 | 1/1990 | Robertson et al. | 422/186 |
| 4,966,759 | 10/1990 | Robertson et al. | 422/186 |
| 5,032,241 | 7/1991 | Robertson et al. | 204/157.15 |
| 5,035,784 | 7/1991 | Anderson et al. | 204/158.14 |
| 5,643,989 | 7/1997 | Van De Grampel et al. | 524/494 |

FOREIGN PATENT DOCUMENTS

97/40936   11/1997   (WO) .

OTHER PUBLICATIONS

Patent Abstract of Japan Publication No. 09310039, Publication Date: Dec. 1997, Name: Kimura Nobuo, Title: "Photocatalyst Coating Agent".

*Primary Examiner*—Richard Weisberger
(74) *Attorney, Agent, or Firm*—Andrew C. Siminerio

(57) ABSTRACT

A matrix for use in a method of photocatalytically decomposing organic compounds in a fluid includes a fiber glass mat substrate carrying a photocatalytic material. The fiber glass mat is made of randomly oriented glass fibers that have been substantially filamentized and needled whereby the filaments are interlocked. Adhesion of the photocatalytic material to the substrate is provided without requiring heat cleaning of the fiber glass by controlling the organic content of the fiber glass mat to be less than 1.0 percent by weight as measured by loss on ignition. This is achieved by using sizing compositions that preferably have little or no film forming polymer content.

16 Claims, No Drawings

PHOTOCATALYTIC FILTER WITH FIBER GLASS MAT CARRIER

BACKGROUND OF THE INVENTION

This invention involves a structure for utilizing the known photocatalytic effect of certain metal oxides such as titanium dioxide. More particularly, it involves a combination of photocatalytic metal oxides on particular carrier surfaces of fiber glass.

The use of metal oxides such as titanium dioxide to photocatalytically decompose organic material has been extensively treated in the prior art. In addition to titanium dioxide, the photocatalytic effect has been reported to have been achieved with the oxides of zinc, tungsten, and tin. The present invention is expected to be useful with any photocatalyst that can be coated onto fiber glass. These may include some known photocatalytic non-oxide substances as well, but the ease of depositing the metallic oxides by presently known techniques makes them the preferred category for use with extended surface area substrates.

The utility of the photocatalytic compounds depends largely upon providing a solid carrier with large surface area so as to increase the contact area with the liquid or gas being treated. In U.S. Pat. No. 5,045,288 a layer of catalyst particles is loosely supported on a filter or in a granular bed. A more practical approach is to coat a solid support member with the catalyst. For example, use of porous ceramic substrates to support titanium dioxide coatings is disclosed in U.S. Pat. No. 5,035,784. Because the photocatalytic effect requires exposure of the catalyst to ultraviolet radiation, the use of a transparent substrate such as glass has been suggested. In particular, it has been recognized in U.S. Pat. Nos. 4,892,712; 4,966,759; and 5,032,241 (all to Robinson et al.) that fiberglass combines both transparency and high surface area, whereby carriers made from matrices of fiberglass are ideally suited for this purpose. The Robinson et al. patents mention both woven and non-woven fiber glass substrates, but woven meshes are preferred, and no details regarding non-woven embodiments are provided.

A non-woven fiber glass mat would be preferred over a woven mesh because substantially greater surface areas are attainable with a non-woven mat. Sizing compositions are typically applied onto fiber glass in order to reduce abrasion during processing. Additionally, when fiber glass is made into mats, it is common to apply organic binders to provide structural integrity to the mat structure. These sizings and binders, although useful to the manufacturer of the fiber glass mats, are a detriment to their use by makers of photocatalytic matrices. The organic polymer content of the sizings and binders significantly reduce adhesion of non-polymeric coatings such as the photocatalytic materials to the fiber glass mats. Attempts to use fiber glass mats as substrates for photocatalytic applications have entailed the added step of removing at least some of the organic content by heat cleaning (i.e., removing organics by combustion or volatilization at high temperature). Moreover, since it is desirable to maintain the structural integrity of the mat during processing at the user's facility, the heat cleaning step is generally carried out immediately prior to applying the photocatalytic material. Eliminating this step would be highly desirable to manufacturers of photocatalytic devices who wish to use fiber glass mat substrates.

It is also desirable for a photocatalyst support material to present a relatively low pressure drop to the flow of fluid (particularly air) therethrough. To achieve low pressure drop with an non-woven fiber glass mat would normally require maintaining the density of the mat low. But reducing the density also reduces the strength of a mat that is needed to be able to handle it in the normal processing operations involved with converting the mat to a photocatalytic matrix. Strength can be provided to a mat by organic binders, but adding such binders would be at odds with the objective of minimizing the organic content of the mat.

SUMMARY OF THE INVENTION

It has now been found that a uniquely constructed fiber glass mat can meet the objectives of providing low density and low organic material content that permit it to be used directly to manufacture a photocatalytic matrix. The fiber glass mat of the invention comprises glass fibers randomly oriented in a layer that has major dimensions in a plane and a minor thickness normal to said plane, a majority of the glass fibers being present as separate filaments, portions of said filaments extending in directions generally normal to said major dimension plane so as to interlock the mat structure. The mat contains organic material in an amount less than 1.0 weight percent as measured by loss on ignition ("LOI"), and the glass fibers and organic material in said layer have a density of 150 to 600 grams per square meter.

Preferred mat densities are 150 to 300 grams per square meter and most preferably 165 to 240 grams per square meter, which provide the desired low pressure drop when used as a catalytic air cleaner. LOI is preferably less than 0.5 weight percent, most preferably less than 0.4 weight percent. This low organic content permits applying photocatalytic material without the need for a heat cleaning step. Sizing may still be used, and the presence of some sizing is preferred, but its nature is such that heat cleaning is not necessary to attain good adhesion of the photocatalytic material. Despite the low mat density and low binder or sizing content, the mat has sufficient strength to permit the mat to be subjected to the normal handling steps associated with applying catalytic material onto the substrate.

The low organic content of the photocatalytic substrate of the present invention stems not only from the reduced reliance on organic binder and sizing materials, but also from the selection of sizing compositions that have little or no film-forming component compared to conventional sizing compositions. Instead, the sizing compositions are comprised primarily of constituents that are traditionally categorized as the lubricant and/or coupling agent components of sizing compositions. Although it is believed that some film forming may occur with some of the lubricant and/or coupling agent materials, in preferred embodiments the sizing contains no deliberate addition of a component primarily serving as a film former.

The mat of the present invention is characterized by filaments having portions extending in directions generally normal to the plane of the mat. This effect is produced by a needling operation and results in a mechanical interlocking of filaments and strands. By relying more on needling and less on organic binders to provide the required mat strength, less of the film-forming polymeric components usually included in sizings or binders need be used. Needling also results in increased mat loft due to spikes of fiber being pulled beyond the original surface of the mat. The mats of the present invention may also be characterized by relatively high loft relative to the low density.

An additional preferred feature of the mats of the present invention is that they are highly filamentized, i.e., the strands of glass fiber are separated into individual filaments. This improves surface area for a given mat density and aids in the mechanical intermeshing that permits the use of low organic content in the present invention. Preferably the glass fibers are 70 percent filamentized, and most preferably at least 80 percent filamentized.

One aspect of the present invention is the fiber glass mat substrate upon which photocatalytic material may be deposited. The mats of the present invention may have other utilities, such as for reinforcing thermoplastic or thermosetting polymeric material. Another aspect if the invention is a matrix including the fiber glass mat substrate plus photocatalytic material capable of photocatalytically decomposing organic compounds in a fluid.

DETAILED DESCRIPTION

The present invention employs a fiber glass mat as the substrate upon which photocatalytic material is supported. The processes of manufacturing fiber glass and forming it into a mat are well known in the art and are not themselves part of the present invention. Accordingly, any conventional means for performing these steps may be used and need not be described in detail. The description herein of the fiber forming and mat forming steps are not intended to limit the types of processes that may be used, but rather are merely examples that are included for the sake of disclosing the best mode of carrying out the invention. If needed, further details of these conventional aspects of the invention may be found in K. Loewenstein, *The Manufacturing Technology of Continuous Glass Fibres*, 3rd Ed. (1993).

The mat may be comprised of fibers of known glass compositions based upon silicon oxide selectively modified with other oxide and non-oxide compounds. Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass." Preferred glass fibers are formed from E-glass. Such compositions and methods of making glass filaments therefrom are well known to those skilled in the art, as demonstrated by Loewenstein (supra), pages 30–44, 47–60, 115–122, and 126–135, which are hereby incorporated by reference.

Glass fibers have been made with nominal filament diameters ranging from about 3.5 to about 35.0 micrometers, and any filament diameter could theoretically be used in the present invention. Even smaller filament diameters are possible, particularly with spun fiber glass, but it is preferred to use filaments above 3.5 to avoid the presence of respirable fibers. Furthermore, filament diameters less than 7 micrometers are not readily available commercially. Specific embodiments of the present invention have used fibers with a nominal filament diameter of 10 micrometers. Higher diameters, on the order of 17 micrometers or greater, may also be considered for use in the present invention and may have advantages in ease of processing. The filament diameter, however, is not critical to the present invention. For further information regarding nominal filament diameters and designations of glass fibers, see Loewenstein (supra) at page 25, which is hereby incorporated by reference. Individual filaments are usually gathered together to form strands. The number of filaments per strand can range from about 100 to about 15,000, and is typically about 200 to about 7000. For more information regarding glass fiber strand designations, see Loewenstein (supra) at page 27, which is hereby incorporated by reference.

To prevent destructive abrasion between filaments during processing, glass fibers are conventionally coated on at least a portion of their surfaces with a sizing composition which serves to lubricate the fibers and to bind the filaments into the strands. Conventionally, most sizing compositions contain as their largest organic component a polymeric film-forming material. Most conventional sizing compositions also contain a coupling agent, a lubricant, and a surfactant. Other minor additives may also be present, such as anti-static agents. In order to minimize the organic content of the fiber glass, the present invention uses sizing compositions that include little or none of the materials that would normally be considered primarily film-forming. This is not to imply that no film forming occurs with the remaining components. Coupling agents in particular, when present, are believed to produce some degree of film forming, although not of the elastomeric type for which the conventional film formers are chosen. In the present invention, a relatively friable film is not considered disadvantageous because such a film aids in the opening of the strands to individual filaments which takes place in the subsequent mat forming steps. Filamentizing is advantageous because the surface area of the mat is increased and greater opportunity for mechanical intertwining of the filaments is presented. In the present invention the sizing components are chosen primarily for their lubricating function, and therefore preferably include a conventional lubricant. Coupling agents may also serve a lubricating function, so sizing compositions of the present invention may include coupling agents in place of or in addition to a conventional lubricant.

The glass fiber lubricants, at least one of which is included in the sizing of the present invention, are different from what are conventionally considered polymeric film-forming materials. The glass fiber lubricants may have some film-forming capability, but would not otherwise be chosen for that purpose. Useful glass fiber lubricants include cationic, non-ionic or anionic lubricants and mixtures thereof. The fiber lubricant can comprise 0 to 100 weight percent of the sizing composition based on total solids. Preferably a combination of lubricant and coupling agent are used, in which case the lubricant may be present in amounts of 1 to 20 weight percent based on total solids of the sizing composition. Some examples of the many known fiber lubricants include amine salts of fatty acids (including, for example, a fatty acid moiety having 12 to 22 carbon atoms and/or tertiary amines having alkyl groups of 1 to 22 atoms attached to the nitrogen atom), alkyl imidazoline derivatives (such as can be formed by the reaction of fatty acids with polyalkylene polyamines), acid solubilized fatty acid amides (for example, saturated or unsaturated fatty acid amides having acid groups of 4 to 24 carbon atoms such as stearic amide), condensates of a fatty acid and polyethylene imine and amide substituted polyethylene imines, such as EMERY® 6717, a partially amidated polyethylene imine commercially available from Henkel Corporation.

Useful alkyl imidazoline derivatives include CATION X from Rhone Poulenc of Princeton, N.J., and LUBRIL CAT-X/VC from Rhodia of Cranbury, N.J. Other useful lubricants include RD-1135B epoxidized polyester which is commercially available from Borden Chemical of Louisville, Ky., CIRRASOL 185A fatty acid amide, KETJENLUBE 522 partially carboxylated polyester which is commercially available from Akzo Chemicals, Inc. Of Chicago, Ill. and PROTOLUBE HD high density polyethylene emulsion which is commercially available from Sybron Chemicals of Birmingham, N.J.

Coupling agents that may be included in the sizing compositions of the present invention may be selected from the group consisting of organo silane coupling agents, transition metal coupling agents (such as titanium, zirconium and chromium coupling agents), amino-containing Werner coupling agents and mixtures thereof. These coupling agents typically have dual functionality. Each metal or silicon atom has attached to it one or more groups which can react with the glass fiber surface or otherwise be chemically attracted, but not necessarily bonded, to the glass fiber surface. Conventionally, the other functionality included in coupling agents provides reactivity or compatibilization with film forming polymers. Since the usual film forming polymers are not relied upon in the present invention, this functionality is less important. However, some self crosslinking capability with some coupling agents may be provided by the additional functionality.

Organo silane compounds are the preferred coupling agents in the present invention. Examples of suitable organo silane coupling agents include Z-6040 gamma-glycidoxypropyltrimethoxysilane commercially available from Dow Corning, A-187 gamma-glycidoxypropyltrimethoxysilane, A-174 gamma-methacryloxypropyltrimethoxysilane and A-1100 gamma-aminopropyltriethoxysilane, each of which are commercially available from OSi Specialties, Inc. of Tarrytown, N.Y. The amount of coupling agent can be 0 to 80 weight percent of the sizing composition on a total solids basis. In preferred embodiments, the coupling agent content is at least 10 percent, most preferably at least 30 percent. The organo silane coupling agent can be at least partially hydrolyzed with water prior to application to the glass fibers.

The sizing composition may include one or more surfactants for stabilizing the other components of the sizing composition in an aqueous medium. When it is applied onto the glass fibers, the sizing composition is preferably diluted with water by several times its weight. Examples of suitable surfactants include polyoxyalkylene block copolymers (such as PLURONIC™ F-108 polyoxypropylene-polyoxyethylene copolymer which is commercially available from BASF Corporation of Parsippany, N.J.), ethoxylated alkyl phenols (such as IGEPAL CA-630 ethoxylated octylphenoxyethanol which is commercially available from GAF Corporation of Wayne, N.J.), polyoxyethylene octylphenyl glycol ethers, ethylene oxide derivatives of sorbitol esters and polyoxyethylated vegetable oils (such as EMULPHOR EL-719, which is commercially available from GAF Corp.). Generally, the amount of surfactant can be 0 to 40 weight percent of the sizing composition on a total solids basis.

Minor amounts of various additives may also be present in the sizing such as anti-static agents, fungicides, bactericides, and anti-foaming materials. Also, organic and/or inorganic acids or bases in an amount sufficient to provide the aqueous sizing composition with appropriate pH (typically 2 to 10) may be included in the sizing composition. Water (preferably deionized) is included in the sizing composition in an amount sufficient to facilitate application of a generally uniform coating on the fiber glass. The weight percentage of solids of the sizing composition generally range from about 5 to about 20 weight percent, but the dilution of the sizing may vary considerably depending upon such factors as the type of applicator used.

A sizing composition used in a preferred embodiment of the present invention was made as follows:

| | Component | Amount (parts by weight) |
|---|---|---|
| 1 | Water | 3632.00 |
| 2 | Acetic acid | 45.40 |
| 3 | Silane[1] | 169.50 |
| 4 | Cationic softener[2] | 18.16 |
| 5 | Warm water | 484.20 |
| 6 | Surfactant[3] | 84.80 |
| 7 | Warm water | 484.20 |

[1]A-1100 gamma aminopropyltriethoxysilane from OSi Specialties, Inc. of Tarrytown, New York.
[2]LUBRIL CAT-X/VC, an imidazoline from Rhodia, Inc., Cranbury, New Jersey.
[3]IGEPAL CA-630 from GAF Corporation, Wayne, New Jersey.

Components 4 and 5 were pre-mixed by stirring for 20 minutes before being added to the other components. Components 6 and 7 were pre-mixed by stirring for 20 minutes before being added to the other components.

The sum total of all of the organic constitutents of the sizing composition described above are minimized in the present invention so as to avoid the need for a heat cleaning step. In general, the LOI of the glass fiber mat is less than 1.0 weight percent, preferably less than 0.5 weight percent, most preferably less than 0.4 weight percent. Some sizing is preferably present, but, as described above, its constituents are selected so as to minimize the LOI. In those preferred embodiments where some sizing is present, the LOI of the mat is at least 0.1 weight percent.

The sizing can be applied onto the filaments by any of the various ways known in the art, for example by contacting the filaments with a static or dynamic applicator, such as a roller or belt applicator, or by spraying or by other means. For a discussion of suitable applicators, see Loewenstein (supra) at pages 165–172, which is hereby incorporated by reference. Sized filaments may be gathered together into strands. The number of filaments per strand can range from about 100 to about 15,000, more typically about 200 to about 7000. For more information regarding glass fiber strand designations, see Loewenstein (supra) at page 27, which is hereby incorporated by reference.

The sized strands may be dried at room temperature or at elevated temperatures to remove water content and to cure any curable sizing or secondary coating composition that may be present. Drying of glass fiber forming packages or cakes is conventional in the art, and further details may be seen in Loewenstein (supra) at pages 219–222, which is hereby incorporated by reference.

Although not a preferred practice for the present invention, a secondary coating may be applied to the strands. The secondary coating composition is preferably aqueous-based and may include components similar to the sizing compositions discussed above. The secondary coating composition may be applied to at least a portion of the surface of the strands in an amount effective to coat or impregnate the portion of the strands. The secondary coating can be conventionally applied by dipping the strand in a bath containing the composition, by spraying the composition upon the strand or by contacting the strand with a static or dynamic applicator such as a roller or belt applicator, for example. The coated strand can be passed through a die to remove excess coating from the strand and/or dried as discussed above for a time sufficient to at least partially dry and cure the secondary coating. If used, a secondary coating would have a composition similar to that of the sizing compositions disclosed above. After drying, it is a common practice for strands intended for mats to be gathered together into roving packages by winding together several generally parallel strands.

Preferably mats are formed from strands that have been chopped by a chopper into discontinuous lengths. In order to facilitate fabricating the mats and interlocking the filaments, these chopped lengths are generally provided with a mean average length greater than 2 centimeters and generally no greater than 10 centimeters. Smaller lengths are generally difficult to convert into a structurally integrated mat, and longer lengths are difficult to handle in the mat forming process. Chopped lengths of 5 centimeters have been used successfully, and some strength advantage may be achieved with slightly larger lengths on the order of 7 to 8 centimeters. Commercially available choppers are suitable, such as Model 90 chopper from Finn and Fram, Inc. Useful apparatus and processes for forming a layer of chopped strands is disclosed in Loewenstein (supra) at pages 293–303, which are hereby incorporated by reference.

For the sake of providing high surface area in the catalytic substrates of the present invention, the fiber glass strands are at least partially filamentized, that is, the bundles of filaments that comprise the strands are at least partially separated into individual filaments. The glass fibers in the mats of the present invention are preferably at least 70 weight percent filamentized, more preferably at least 80 percent filamentized, and most preferably at least 90 percent filamentized. Although 100 percent filamentizing would be optimum, it is seldom fully achieved. Filamentizing per se is known in the art, and can be accomplished by mechanical or pneumatic means that are typically associated with the mat forming apparatus. An example of such an apparatus which advantageously imparts a high degree of filamentizing to the strands is the RANDO-OPENER BLENDER, which is a part of the MODEL B RANDO-WEB® processor commercially available from Rando Machine Corporation of Macedon, N.Y. Alternatively, the strand opener can be a carding machine, such as those commercially available from Hollingsworth on Wheels, Inc. of Greenville, S.C. or N. Schlumberger (USA) Inc. of Charlotte, N.C. The opening action of the Rando model is the agitation produced by passing the strands between a series of rolls rotating in opposite directions. The percentage of strand filamentized can be adjusted by adjusting the spacing between the opposing rolls of the strand opener and the rotational speed of the rolls.

Following the opening process, the fiber glass may be conveyed to a mat forming apparatus. A preferred mat former is a RANDO-WEBBER®, part of the MODEL B RANDO-WEB® processor discussed above. In the Rando process the glass fibers are conveyed by an air stream. In this type of mat former, fibers are deposited upon the surface of a rotating cylindrical feed mat condenser screen maintained at a pressure below atmospheric pressure to form a feed mat. The feed mat is doffed from the feed mat condenser and fed to a lickerin which combs individual strands and monofilaments from the feed mat which are then carried by another air stream and deposited as a mat on the surface of another rotating cylindrical condenser screen which is maintained at a pressure below atmospheric pressure. The mat thus formed is conveyed from the mat former to a needling station.

Conventional mats are sometimes combined with minor amounts of unidirectional glass fibers, thermoplastic fiber and/or fabrics. The purpose for these additional fibers is to provide temporary strength to the mat during manufacturing prior to laminating. These supplemental strands and/or fabric may be positioned between layers of the mat or on one side of the mat and then subjected to the needling operation. Although not precluded by the present invention, these supplemental layers have not been found necessary with preferred embodiments of the present invention. It is noteworthy that the mechanical strength of the mats of the present invention can be attained without such reinforcing strands or fabric.

The glass filaments and glass fiber strands of the mat (as well as any supplemental fibers) are intermeshed by subjecting the mat to a needling process. The needling can be accomplished using a conventional needling apparatus as used in the fiber glass reinforcement industry, wherein the mat is passed between spaced needling boards. An example of such an apparatus is disclosed in assignee's U.S. Pat. No. 4,277,531 (Picone), which is hereby incorporated by reference. An example of one suitable needling machine is Model NL 9 which is commercially available from Textilmaschinenfabrik Dr. Ernest Fehrer AG of Germany. In the needling operation, an array of barbed needles is used to entangle or intertwine the monofilaments and strands of the mat to impart mechanical strength and integrity to the mat. The effect of needling is to displace a portion of the filaments and/or strands out of the generally planar array of the mat and in to a direction substantially normal to the plane of the mat. The extent to which this displacement occurs depends upon such factors as the type of needles used, the depth of needle penetration through the mat, and the density of needle punches.

The needling operation may use needles that are constructed with barbs that angle toward the needle tips, whereby fibers in the mat are entangled as the needles pass into the mat. On the withdrawal stroke, this needle type generally releases fibers. Although needles with downwardly pointed barbs are preferred, the use of reverse barb needles (i.e., angled away from the needle tip) is not precluded in the present invention. Because of the low density of the mats of the present invention, it has been found advantageous to use needles that are relatively thin. Needles of heavier gauge than 25 gauge (i.e., with small gauge numbers) tend to break undue numbers of filaments, thereby failing to improve strength as intended. Needles of 30 gauge lighter, and preferably 32 gauge and lighter, are recommended with the low density mats of the present invention. A particularly useful commercially available needle type is the "star" type of needle which has six barbs spaced in a triangular arrangement around the shaft of the needle, with pairs barbs in vertical alignment above each other. Because it has also been found desirable to limit needle punch depth, it is advantageous that the "star" type of needle locates the barbs close to the tip of the needle. Suppliers of these types of needles include the Foster Needle Company, Manitowoc, Wis., and Groz-Beckert USA, Chatrlotte, N.C.

As used in the description of the needling operation herein, the terms "horizontal" or "horizontally" refer to a plane generally parallel to the major plane of the mat, which is typically parallel to the ground. As used herein, the terms "vertical" or "vertically," "downwardly," and "upwardly" refer to a direction generally normal to "horizontal." It should be understood that these specific directional terms are used to describe the needling operation for convenience, reflecting the usual orientation of the needling apparatus, and for defining the directions relative to each other, but that these orientations are not limitations on the process.

On the entering needling stroke, the needles carried on the needle board pass through the mat and into generally cylindrical orifices in a backer board supporting the mat. Depending upon the needling depth, one or more of the tiers of barbs pass entirely through the mat and into the backer board orifices. For the purposes of the present invention, when a two-tier needle design is used, it is preferred that both tiers of barbs pass through and beyond the mat. The distance that the needles pass beyond the mat and into the orifices in the backer board is termed the "needling depth." Needling depth in preferred embodiments range from 0.45 to 0.65 inches (1 centimeter to 1.7 centimeter).

During the withdrawal stroke, after the needles exit the mat, they are passed through a plurality of generally cylindrical orifices in a metal stripper plate spaced from the mat during the needling process. The filaments and strands are pulled from the barb by the stripper plate, and the mat is then advanced after the complete stroke of inserting. and withdrawing the needles. The needle board may be reciprocated with a frequency of about 80 to about 3000 strokes per minute. A needler is typically provided with rolls to propel the mat in the horizontal direction during needling. At slower frequencies the advancement occurs intermittently in the interval between punches of the needles. At faster frequencies, the advancement approaches a continuous motion.

The punch density also may be varied to affect the reinforcement of the mat. Needle punch density will depend upon the particular type of needles used, the mat thickness, and other factors. In the context of the other preferred needling parameters disclosed herein, needle punch density preferably ranges from 100 to abut 160 punches per square inch (15 to 25 punches per square centimeter). Smaller punch densities are possible, but may not attain the desired mat strength without binders. Larger punch densities at some point tend to produce diminishing returns, actually decreasing the mat strength. Preferred embodiments employed approximately 140 punches per square inch (23 punches per centimeter).

The needling process is described in further detail in assignee's U.S. Pat. No. 4,335,176 (Bauman), which is hereby incorporated by reference.

In a typical needling process, the mat entering the needler can have an overall average thickness of about 5 to about 30 millimeters. After passage through the needler, the mat may have a compressed average thickness of about 2.5 to about 7 millimeters. The thickness, or "loft" of the mat is influenced by the extent to which spikes of fiber extend from the face of the mat due to the needling process. In the mats of the present invention, loft is relatively high for the low density. Loft in preferred embodiments of the mat of the invention exceeds 0.25 inch (6.3 millimeters), and preferably exceeds 0.35 inch (8.9 millimeters). Maximizing loft is generally desirable for this present invention, but to achieve loft greater than about 0.5 inch with mats of the type involved here may require excessive needling, which may have a detrimental effect on tensile strength. Loft was measured by placing a weight of one ounce on a one foot square area and measuring the thickness of the compressed mat.

Tensile strength was measured with a 3 inch (7.6 centimeters) by 9 inch (22.9 centimeters) specimen of the mat drawn in its long dimension with an Instron Series IX Materials Testing System. Preferred embodiments of the invention exhibited tensile strengths greater than 8.0 pounds per linear foot width of mat, and greater than 10.0 pounds in the best embodiments.

Extensive literature exists describing the application of photocatalytic materials onto glass substrates. The present invention is not limited to any particular technique of producing the photocatalytic coating, but for the sake of impregnating a high surface area substrate such as a fiber glass mat, it is advantageous to use those photocatalytic materials that can be applied from a liquid medium. By dipping the mat into a liquid coating composition a large surface area may be coated with the photocatalytic material. The metal oxide photocatalysts lend themselves to a dip coating process because metallic alkoxides can be dissolved in a liquid solvent (usually alcohol) in which the mat may be immersed. Subsequently, the deposited alkoxides may be hydrolyzed to form a metallic oxide film that bonds well to the glass substrate. A preferred process of this type is disclosed in U.S. Pat. No. 4,966,759 (Robertson et al.). More specifically, the process of that patent entails using a metal alkoxide as the starting material, which in the preferred case of titanium dioxide photocatalysts, may be, for example titanium ethoxide. The titanium ethoxide is dissolved in an organic solvents such as anhydrous ethanol and reacted with a controlled amount of an acid, such as nitric acid, and water to form a coating solution. The fiber glass mat may be dipped into that coating solution under dry conditions for a period of time on the order of one minute. Subsequently drying the coated mat in room temperature air causes the alkoxide to hydrolyze, thereby producing an amorphous, polymeric titanate layer on the mat. After drying the coating for one to two hours, the coated mat is heated to a temperature sufficient to converting the amorphous layer to a photocatalytically active crystalline form (anatase in the case of titanium dioxide). The heating cycle to produce anatase titanium dioxide may include a slow heat-up period on the order of 2 to 5 hours, a one hour hold at about 400° C., and a cool-down period on the order of 5 hours or more. It should be understood that the coating and heat treating conditions will vary, depending upon the particular materials used, as would be known to those of skill in the art.

It is also known to apply catalytic metal oxide onto substrates using aqueous media. These may use aqueous solutions or slurries of titanate products available under the name TYZOR from DuPont, particularly the chelated versions, or similar products from Degussa.

An additional advantage thought to be attributable to the presence of the coupling agents in the preferred embodiments of the present invention is that improved coating of the wet photocatalytic material onto the fiber glass substrate is attained. In the conventional practice of heat cleaning the substrate, this advantage is lost due to thermal decomposition of any coupling agent present.

It is known to dope metal oxides with other metals such as platinum to enhance the photocatalytic activity of the catalyst, and the photocatalytic matrix of the present invention may include such dopants.

The invention has been described in connection with particular embodiments for the sake of providing the best mode of the invention. It should be understood that other variations and modifications as would be known to those of skill in the art may be employed within the scope of the invention as defined by the claims.

What is claimed is:

1. A matrix for use in a method of photocatalytically decomposing organic compounds in a fluid, comprising: a fiber glass mat substrate made of randomly oriented glass fibers that have been at least partially filamentized, including a majority of filaments randomly lying in a generally planar layer and additional filaments having portions extending in directions generally normal to said plane so as to interlock at least a portion of the filaments; organic material on at least a portion of the glass fibers in an amount less than 1.0 percent by weight of the fiber glass mat substrate as measured by loss on ignition; and a photocatalytic material carried on said substrate in sufficient quantity to render the matrix photocatalytically active.

2. The structure of claim 1 wherein the organic material content of the substrate is characterized by no more than 0.5 percent by weight loss on ignition.

3. The structure of claim 1 wherein the organic material content of the substrate is characterized by no more than 0.4 percent by weight loss on ignition.

4. The structure of claim 1 wherein the organic material content of the substrate is characterized by a t least 0.1 percent by weight loss on ignition.

5. The structure of claim 1 wherein the photocatalytic material comprises a metal oxide.

6. The structure of claim 5 wherein the photocatalytic material comprises titanium dioxide.

7. A fiber glass mat comprising:
  glass fibers randomly oriented in a layer that has major dimensions in a plane and a minor thickness normal to said plane, a majority of the glass fibers being present as separate filaments, portions of said filaments extending in directions generally normal to said major dimension plane so as to interlock the mat structure; organic material in an amount less than 1.0 percent by weight as measured by loss on ignition; the quantity of glass fibers and organic material in said layer being provided with a density of 150 to 600 grams per square meter of said plane; and a coating of photocatalytic metal oxide material.

8. The fiber glass mat of claim 7 wherein the quantity of glass fibers and organic material in said layer are provided with a density of 150 to 300 grams per square meter of said plane.

9. The fiber glass mat of claim 7 wherein the quantity of glass fibers and organic material in said layer are provided with a density of 165 to 240 grams per square meter of said plane.

10. The fiber glass mat of claim 7 wherein at least 70 percent of the glass fibers are present as separate filaments.

11. The fiber glass mat of claim 7 wherein at least 80 percent of the glass fibers are present as separate filaments.

12. The fiber glass mat of claim 7 wherein its organic material content is less than 0.5 percent by weight.

13. The fiber glass mat of claim 7 wherein its organic material content is less than 0.4 percent by weight.

14. The fiber glass mat of claim 7 wherein its organic material content is at least 0.1 percent by weight.

15. The fiber glass mat of claim 7 wherein the organic material comprises a cured sizing composition that includes an organo silane.

16. The fiber glass mat of claim 7 wherein the tensile strength of the mat is at least 8 pounds per foot of width.

* * * * *